United States Patent Office 3,126,411
Patented Mar. 24, 1964

---

3,126,411
PROCESSES AND INTERMEDIATES FOR PREPARING BASIC TRICYCLIC COMPOUNDS
Gérald Rey-Bellet, Reinhard Schläpfer, and Hans Spiegelberg, Basel, Switzerland, and Karl Doebel, Ossining, N.Y., assignors to Hoffmann-La Roche Inc., Nutley, N.J., a corporation of New Jersey
No Drawing. Original application Feb. 5, 1960, Ser. No. 6,841, now Patent No. 3,073,847, dated Jan. 15, 1963. Divided and this application Apr. 30, 1962, Ser. No. 191,317
Claims priority, application Switzerland Feb. 12, 1959
5 Claims. (Cl. 260—570.8)

This invention relates to novel chemical processes; and to novel chemical compounds which are useful, inter alia, as intermediates in said processes.

This application is a division of application Serial No. 6,841, filed February 5, 1960, now U.S. Patent 3,073,847, patented January 15, 1963, the filing date of which is claimed.

More particularly, the invention in one of its aspects relates to novel processes for preparing certain end products, known prior to the invention and useful as medicinal agents in virtue of their pharmacological activity. These products of the processes of the invention can be characterized broadly, in a chemical sense, as being basically substituted tricyclic compounds; the tricycle being that of xanthene, thioxanthene or dibenzo[a,e]cyclohepta[1,5]diene or their respective nuclear substitution products wherein the nuclear substitution referred to is in one or both of the aromatic (i.e. end) nuceli and the substituent or substituents are selected from the group consisting of alkyl (e.g. methyl, ethyl, isoamyl, etc.), aralkyl (e.g. benzyl, α-phenylethyl, β-phenylethyl, etc.), aryl (e.g. phenyl, tolyl, naphthyl, etc.), alkoxy (e.g. methoxy, ethoxy, hexoxy, etc.), aralkoxy (e.g. benzyloxy, etc.), aryloxy (e.g. phenoxy, tolyloxy, etc.), alkylthio (e.g. methylthio, ethylthio, etc.), aralkylthio (e.g. benzylthio, etc.), arylthio (e.g. phenylthio), halo (e.g. bromo, chloro, iodo), protected acyl (e.g. acetyl monoketol), protected amino (e.g. acetamido, benzamido), protected hydroxy (e.g., acetoxy, carbobenzoxy), and protected carboxy (e.g. carbethoxy, carbomethoxy); and the basic substituent referred to its a tertiary amino group in a non-aromatic side chain connected by a semicyclic double bond to that carbon atom in the middle ring of the tricyclic system which is opposite the bridging radical (oxygen, sulfur, or ethylene, respectively).

As indicated, the end products above characterized are known substances and are not herein claimed as novel. These end products are disclosed, for instance, in German Federal Republic "Auslegeschrift" 1,044,103, opened to public inspection November 20, 1958, and Belgian Patent 577,057. Moreover, certain of the end products are in clinical use; thus, the compound herein identified as trans-2-chloro-9-(3-dimethylaminopropylidene)-thioxanthene hydrochloride is available on the market as a tranquillizer.

In order that the numbering systems employed in the various nomenclatures herein recited may be clear, it will be appropriate to note that the xanthone nucleus is numbered according to the scheme of "Ring Index" System No. 2000, i.e.

(I) 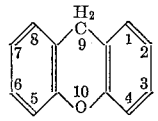

the thioxanthene nucleus is numbered according to "Ring Index" System No. 2019, i.e.

(II) 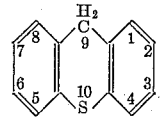

and the dibenzo[a,e]cyclohepta[1,5]diene nucleus is numbered according to "Ring Index" System No. 2077, i.e.

(III) 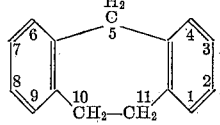

Broadly stated, a novel process aspect of the invention provides a method of making the end products referred to above which comprises: condensing (a) a compound selected from the group consisting of those represented by the general formula (IV) 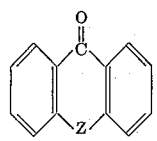

wherein Z represents a divalent bridging radical selected from the group consisting of oxygen (—O—), sulfur (—S—) and ethylene (—CH$_2$CH$_2$—), and nuclear substitution products thereof wherein the substituent or substituents are in an aromatic (i.e. end) nucleus and are selected from the group consisting of alkyl, aralkyl, aryl, alkoxy, aralkoxy, aryloxy, alkylthio, aralkylthio, arylthio, halogen, protected acyl, protected amino, protected hydroxy and protected carboxy, with (b) a compound represented by the general formula (V)             M—C≡C—B wherein M represents an alkali metal (especially lithium, sodium or potassium) and B represents, a monovalent, non-aromatic radical which carries a tertiary amino group; decomposing the organometallic condensation product obtained, e.g. by treatment with an ammonium salt or hydrolysis, thereby producing the corresponding tertiary alcohol; completely hydrogenating the acetylenic linkage in the latter; and splitting out water at the tertiary alcohol group in the hydrogenation product.

The ketone starting materials of the invention belong to known classes of compounds, see "Auslegeschrift" No. 1,044,103 and Belgian Patent 577,057, mentioned above. The acetylenic starting materials, Formula V, can be made by treating the corresponding basically substituted alkynes with an alkali metal in liquid ammonia. The thus obtained suspension of compound (V) in liquid ammonia can be used directly for the condensation with the ketone starting material.

In a preferred embodiment of the invention, the ketone starting material is xanthone, thioxanthone or dibenzo-[a,e]cyclohepta[1,5]dien-5-one or a substituted derivative of any of said ketones wherein there are present one or two substituents in an aromatic nucleus selected from a limited group consisting of halogen (especially middle halogens, i.e. chlorine and bromine), lower alkyl and lower alkoxy; and the acetylenic starting material is a propargyl-substituted tertiary amino compound (e.g. dimethyl propargyl amine, diethyl propargyl amine, N-propargylpiperidine, N-propargylmorpholine, N-propargylpiperazine, N-propargyl-N-methylpiperazine, N-propargylpyrrolidine, etc.). In the case of this preferred embodiment of the invention, the overall process can be represented by the following flowsheet, wherein the symbol Z represents a divalent radical selected from the group consisting of oxygen, sulfur and ethylene; M represents an alkali metal; Q represents a member selected from the group consisting of hydrogen, halogen, lower alkyl and lower alkoxy; $m$ represents an integer from 1 to 2, inclusive; and Am represents a tertiary amino radical:

FLOWSHEET

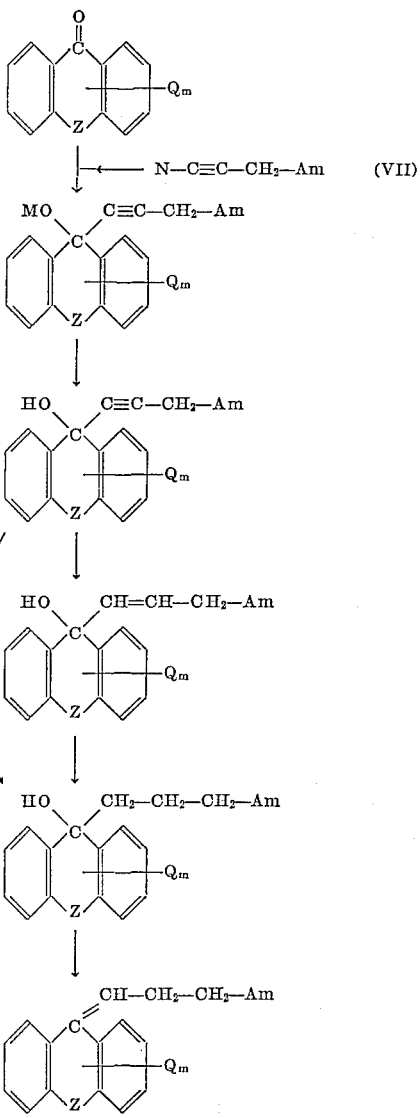

The classes of compounds represented, respectively, by the above general Formulas VIII, IX and X are novel intermediates, and constitute valuable additional aspects of the invention. The compounds represented by general Formulas IX and X, and acid addition salts of IX and X with pharmaceutically acceptable acids (e.g., inorganic acids such as hydrochloric acid, hydrobromic acid, sulfuric acid, phosphoric acid and the like; and organic acids, such as oxalic acid, citric acid, acetic acid, lactic acid, tartaric acid and the like) are also characterized by manifold activity upon the central nervous system, and are additionally useful as pharmacological and medicinal agents, more particularly as narcosis-potentiating, adrenolytic, sedative, antiemetic, antihistaminic, antipyretic and hypothermic agents.

In a preferred mode of executing the first (or condensation) stage of the process of the invention, the starting ketone in solid, finely pulverized form or in an inert organic solvent, such as ether, benzene or tetrahydrofuran, is added to a suspension in liquid ammonia of the alkali metal-alkyne starting material of Formula V. After the condensation has been effected, the organo- metallic condensation product, e.g. VIII, is subjected to decomposition in order to split out alkali metal and liberate the corresponding tertiary alcohol, e.g. IX. It is particularly recommended to effect the decomposition under practically neutral conditions, for example by reaction with solid ammonium chloride. In this manner, the basically substituted tricyclic tertiary alcohol, e.g. IX, is obtained directly in the free form, and can be separated from byproducts of the reaction and isolated by treatment with suitable water-immiscible organic solvents, e.g. ether, ethyl acetate, chloroform and methylene chloride.

Any acyl, amino, hydroxy or carboxy groups present must be protected before the condensation step, in order to avoid reaction of these groups with the organometallic reagent V. The splitting off of the protective groups is usually effected simultaneously with the decomposition of the organometallic condensation product, e.g. VIII.

In further stages of the processes of the invention, the triple bond in the side chain of the tertiary alcohol obtained, e.g. IX, can be hydrogenated, either partially or completely. In order to convert the triple bond to a double bond, the hydrogenation is advantageously effected at approximately room temperatures and atmospheric pressures, in the presence of palladium carbon or Raney nickel. The thus obtained compound, e.g. X, having a double bond in the side chain can then be further hydrogenated, e.g. to XI, under moderately high hydrogen pressure, e.g. about 30 atmospheres gauge, in the presence of a platinum oxide catalyst. The compound, e.g. IX, having the acetylenic linkage in the side chain can also be completely hydrogenated in a single step, e.g. to XI, advantageously by hydrogenating under a moderately high hydrogen pressure, e.g. about 30 atmospheres gauge, in the presence of a platinum oxide catalyst.

In a further stage of the process according to the invention, the hydrogenated tertiary alcohol, e.g. XI, is subjected to a step of splitting out water. This dehydration step is advantageously effected by heating with alcoholic hydrogen chloride. However, other reagents conventionally used for dehydrating tertiary alcohols can also be employed, e.g. phosphorus oxychloride, p-toluenesulfochloride, sulfuric acid, zinc chloride, potassium bisulfate and the like, in inert organic solvents, e.g. chloroform and methylene chloride.

If the starting ketone employed is asymmetrically substituted in the tricyclic ring system, there are obtained isomeric mixtures upon splitting out water, as described above. These mixtures can be separated into their components according to methods known per se, for example by fractional crystallization.

The following examples are illustrative but not limitative of the invention. Temperatures are in degrees centigrade, uncorrected, except as otherwise indicated.

*Example 1*

1000 ml. of liquid ammonia is charged to a flask provided with a stirrer, dropping funnel, and ammonia condenser, and dried by introduction of sodium chips until the appearance of a permanent blue color. Then a total of 9.2 g. of sodium is introduced, while stirring continuously over a period of 15 to 20 minutes, whereby the sodium is suspended in colloidal form. Then, while continuing the stirring, 46 g. of 3-dimethylamino-1-propyne is added to the reaction mixture over a period of one to two hours; the blue color disappears. To the colorless suspension of 3-dimethylamino-1-propynyl-sodium thus obtained is now added portionwise 95 g. of pulverized 2-chlorothioxanthone. After one-half hour, the reaction mixture is diluted with 500 ml. of ether and the stirring is continued overnight. A total of 30 g. of ammonium chloride is added, the solvent is evaporated, and the residue is stirred with 500 ml. of water. The insoluble material is filtered off, washed salt-free with water, dried and recrystallized from petroleum ether (boiling range 80–105°). In this manner there is obtained 91 g. of 2-chloro-9-(3-dimethylamino-1-propynyl)-9 - thioxanthenol of M.P. 170–172°.

6.6 g. of 2-chloro-9-(3-dimethylamino-1-propynyl)-9-thioxanthenol is dissolved in 240 ml. of methanol, while warming, and shaken with hydrogen under one atmosphere gauge pressure, in the presence of 0.55 g. of 5% palladium-carbon. After uptake of the amount of hydrogen required for conversion of the triple bond to a double bond, the hydrogenation reaction ceases. The colorless hydrogenation product which has crystallized is brought into solution by heating for a short time, and the catalyst is filtered off and washed with a little hot methanol. Upon concentration of the combined methanolic filtrate and washings, there is obtained 6.4 g. of 2-chloro-9-(3-dimethylamino-1 propyenyl)-9-thioxanthenol. Upon recrystallization from ethyl acetate, there are obtained colorless dense crystals of M.P. 158–159°.

3.3 g. of 2-chloro-9-(3-dimethylamino-1-propenyl)-9-thioxanthenol in 300 ml. of isopropanol is hydrogenated at 30° in the presence of 0.2 g. of platinum oxide and 2 g. of iron-free animal charcoal, under a hydrogen pressure of 30 atmospheres gauge. After uptake of the theoretical amount of hydrogen required for saturation of the side-chain olefinic bond, the hyrogenation is interrupted, the catalyst is filtered off, the solvent is evaporated from the filtrate in vacuo, and the residue is recrytsallized from petroleum ether (boiling range 80–105°). There is obtained 3.1 g. of 2-chloro-9-(3-dimethylaminopropyl)-9-thioxanthenol of M.P. 153–154°.

117 g. of 2-chloro-9-(3-dimethylaminopropyl)-9-thioxanthenol is introduced portionwise, while shaking and cooling with water, into 700 ml. of phosphorous oxychloride. A red solution results. This is refluxed for two hours at a bath temperature of 130°, and then concentrated under a water pump vacuum to a syrupy liquid. The latter is cooled and shaken overnight with 3000–3500 ml. of water, whereupon a light brown, clear solution results. The solution is made alkaline to phenolphthalein with approximately 400 ml. of 30% sodium hydroxide solution, filtered, and the filtrate is extracted at 60° three times, each time with 2000 ml. of petroleum ether (boiling range 80–105°). The combined petroleum ether extracts are washed neutral with water and dried over a little sodium sulfate. Then the solvent is carefully taken off on a water bath under a water pump vacuum. The residual oil is purified by distillation at low pressure. Between 160–162°/0.05 mm., a light yellow oil goes over, which upon redistillation appears almost colorless. There is thus obtained 103 g. of 2-chloro-9-(3-dimethylaminopropylidene)-thioxanthene in the form of a viscous oil, which upon standing for some time thickens like honey.

91 g. of 2-chloro-9-(3-dimethylaminopropylidene)-thioxanthene is dissolved in 100 ml. of petroleum ether and allowed to stand for three days in the refrigerator. The trans isomer, which has precipitated in this time, is separated and recrystallized from methanol; M.P. 98–99°. 25 g. of the thus obtained trans-2-chloro-9-(3-dimethylaminopropylidene)-thioxanthene is dissolved in 50 ml. of alcohol, by heating gently, and the solution is mixed with 7.87 g. of 36.5% (w/v.) ethanolic hydrogen chloride solution. The reaction mixture is allowed to stand in the refrigerator and the colorless crystals which form are filtered and washed with cold ethanol. There is thus obtained trans-2-chloro-9-(3-dimethylaminopropylidene)-thioxanthene hydrochloride of M.P. 220°.

*Example 2*

0.3 g. of platinum oxide and 3 g. of animal charcoal in 300 ml. of isopropanol are prehydrogenated. Then, after addition of 3.3 g. of 2-chloro-9-(3-dimethylamino-1-propynyl)-9-thioxanthenol, obtained according to Example 1, the reaction mixture is further hydrogenated at 40°, under 30 atmospheres gauge hydrogen pressure, until two molar proportions of hydrogen have been taken up. The catalyst is filtered off, the solvent is removed in vacuo at 45° on a water bath, and the residue is recrystallized from petroleum ether (boiling range 80–105°). There is obtained 2-chloro-9-(3-dimethylaminopropyl)-9-thioxanthenol of M.P. 153–154° (corr.).

*Example 3*

500 ml. of ammonia is charged to a flask provided with a stirrer, dropping funnel and ammonia condenser, and dried by introduction of sodium chips until the appearance of a blue color. Then 4.1 g. of sodium is introduced, while stirring continuously. After the sodium has gone into colloidal solution, 27.5 g. of 3-(4-methylpiperazino)-1-propyne (prepared by dropping an ethereal solution of propargyl chloride into an ethereal solution of 4-methylpiperazine in a molar ratio of 1:2, heating on a water bath and, after separating the precipitated salt, isolating the desired product by fractional distillation; B.P. 64°/11 mm.; $n_D^{21}$=1.4805) is added. As soon as the color disappears from the ammoniacal suspension of 3-(4-methylpiperazino) - 1 - propynyl - sodium, 42 g. of pulverized 2-chlorothioxanthone is introduced in portions. Then 250 ml. of ether is added and the mixture is stirred overnight. The organometallic compound produced is decomposed by addition of a total of 15 g. of ammonium chloride, the solvent is evaporated and the residue is stirred with 400 ml. of water. The insoluble material is filtered off, washed salt-free with water, dried, and again washed with benzene. After recrystallization from ethyl acetate, there is obtained 38 g. of 2-chloro-9-[3-(4-methylpiperazino)-1-propynyl]-9-thioxanthenol of M.P. 176.4–177.5° (corr.).

*Example 4*

500 ml. of ammonia is charged to a flask provided with a stirrer, dropping funnel and ammonia condenser, and dried by adding sodium chips until the appearance of a permanent blue color. Then 4.5 g. of sodium is introduced, while stirring continuously. After the sodium has gone into solution, 23 g. of 3-dimethylamino-1-propyne is added to the flask and the stirring is continued for an additional period of two hours. To the suspension of the sodium compound thus formed is added portionwise 37 g. of xanthone. After one-half hour, the reaction mixture is diluted with 300 ml. of ether. The stirring is continued overnight, then the reaction mixture is treated with 5 g. of ammonium chloride, the solvent is evaporated, and the residue is stirred with 300 ml. of water. The insoluble material is filtered off, washed salt-free with water, dried, and recrystallized from ethyl acetate. There is thus obtained 34 g. of 9-(3-dimethylamino-1-propynyl)-9-xanthenol of M.P. 195–197°.

*Example 5*

In a flask provided with stirrer, dropping funnel and ammonia condenser, is placed 500 ml. of liquid ammonia, which is dried by adding sodium chips until the appearance of a permanent blue color. Then 5.92 g. of sodium is added in small portions and stirring is continued for an additional period of 15 minutes. To the blue solution obtained is added dropwise 24.2 g. of 3-dimethylamino-1-propyne and the reaction mixture is stirred for two hours, resulting in the disappearance of the blue color. Then a solution of 52.7 g. of dibenzo[a,e]cyclohepta[1,5]dien-5-one in 150 ml. of ether is added dropwise and the mixture is stirred for five hours. At the end of this time, 30 g. of ammonium chloride is added portionwise, the reaction mixture is diluted with 500 ml. of ether, and ammonia is allowed to evaporate overnight. On the following day, the residual material is treated with water, and the ethereal layer is separated and dried. After distilling off the ether, the residue is recrystallized from ethyl acetate/petroleum ether, yielding 60 g. of 5-hydroxy-5-(3-dimethylamino-1-propynyl) - dibenzo[a,e]cyclohepta[1,5]diene of M.P. 155–156°.

11.64 g. of 5-hydroxy-5-(3-dimethylamino-1-propynyl)- dibenzo[a,e]cyclohepta[1,5]diene in 250 ml. of methanol is hydrogenated under normal pressure and at room temperature in the presence of Raney nickel. After uptake of the quantity of hydrogen required for conversion of the triple bond to a double bond, the catalyst is filtered off and methanol is distilled from the filtrate. Upon recrystallization of the residue, there is obtained 11.2 g. of 5-hydroxy-5-(3-dimethylamino - 1 - propenyl) - dibenzo-[a,e]cyclohepta[1,5]diene of M.P. 103.5–104.5°.

5.86 g. of 5-hydroxy-5-(3-dimethylamino-1-propenyl)-dibenzo[a,e]cyclohepta[1,5]diene in 250 ml. of isopropanol is hydrogenated at 35–40° under a hydrogen pressure of 30 atmospheres gauge, in the presence of 0.5 g. of platinum oxide and 5.5 g. of animal charcoal. After uptake of the theoretical quantity of hydrogen required for saturation of the olefinic bond in the propenyl side chain, the hydrogenation is interrupted, the catalyst is filtered off, the filtrate is concentrated, and the residue is recrystallized from petroleum ether (boiling range 80–105°), whereupon 5-hydroxy-5-(3-dimethylaminopropyl)-dibenzo[a,e]cyclohepta[1,5]diene crystallizes; M.P. 116–117°. M.P. of the hydrochloride, 211–212°.

20 g. of 5-hydroxy-5-(3-dimethylaminopropyl)-dibenzo[a,e]cyclohepta[1,5]diene is dissolved in 200 ml. of absolute alcohol, mixed with 20 ml. of 30% (w./v.) ethanolic hydrogen chloride solution and refluxed for 1½ hours. After distilling off the alcohol under diminished pressure, the residue is recrystallized from alcohol/ether. The product, 5 - (3 - dimethylaminopropylidene)-dibenzo[a,e]cyclohepta[1,5]diene hydrochloride, forms colorless water-soluble crystals of M.P. 194–195°.

*Example 6*

5.82 g. of 5-hydroxy-5-(3-dimethylamino-1-propynyl)-dibenzo[a,e]cyclohepta[1,5]diene, obtained according to Example 5, in 250 ml. of isopropanol, is hydrogenated at 35–40° under a hydrogen pressure of 30 atmospheres gauge in the presence of 0.5 g. of platinum oxide and 5.5 g. of animal charcoal. After uptake of the quantity of hydrogen theoretically required for saturation of the acetylenic linkage, the hydrogenation is interrupted, the catalyst is filtered off, the filtrate is evaporated, and the residue is recrystallized from petroleum ether (boiling range 80–105°). The thus obtained 5-hydroxy-5-(3-dimethylaminopropyl) - dibenzo[a,e]cyclohepta[1,5]diene melts at 116–117°.

*Example 7*

In a flask provided with stirrer, dropping funnel and ammonia condenser, 500 ml. of liquid ammonia is placed, and is dried by introducing sodium chips until the appearance of a permanent blue color. Then 9.1 g. of sodium is introduced, and the stirring is continued for 15 minutes longer. To the solution obtained is added dropwise 59 g. of 3-(4-methylpiperazino)-1-propyne (prepared as in Example 3) and the reaction mixture is stirred for three hours, whereupon the blue color disappears. Then a solution of 84.5 g. of dibenzo[a,e]cycloheptal[1,5]dien-5-one in 200 ml. of ether is added dropwise, the reaction mixture is stirred for five hours, and then is treated with 50 g. of ammonium chloride, added in portions; 400 ml. of ether is added and the ammonia is allowed to evaporate overnight. On the following day, the reaction mixture is treated with water and the ethereal layer is separated and dried. The ether is then distilled off and the residue is recrystallized from ethyl acetate/petroleum ether, yielding 81 g. of 5-hydroxy-5-[3-(4-methylpiperazino) - 1-propynyl]dibenzo[a,e]cyclohepta[1,5]diene of M.P. 132–133°.

34.6 g. of 5-hydroxy-5[3-(4-methylpiperazino)1-propynyl]-dibenzo[a,e]cyclohepta[1,5]diene in 1000 ml. of methanol is hydrogenated under normal pressure and at room temperature in the presence of Raney nickel. After uptake of the quantity of hydrogen theoretically required for conversion of the triple bond to a double bond, the catalyst is filtered off and the methanol is distilled from the filtrate. By recrystallization of the residue from petroleum ether (boiling range 80–105°), there is obtained 32.25 g. of 5-hydroxy-5-[3-(4-methylpiperazino)-1-propenyl]dibenzo[a,e]cyclohepta[1,5]diene of M.P. 143–144°.

15 g. of 5-hydroxy-5-[3-(4-methylpiperazino)-1-propenyl]-dibenzo[a,e]cyclohepta[1,5]diene in 500 ml. of isopropanol is hydrogenated at 40° under a hydrogen pressure of 20 atmospheres gauge and in the presence of 1 g. of platinum oxide and 10 g. of animal charcoal. After uptake of the quantity of hydrogen theoretically required for saturation of the propenyl radical, the hydrogenation is interrupted, the catalyst is filtered off, the filtrate is evaporated, and the residue recrystallized from ethyl acetate, whereupon 5-hydroxy-5-[3-(4-methylpiperazino)-propyl] - dibenzo[a,e]cyclohepta[1,5]diene crystallizes, M.P. 165–166°.

6.8 g. of 5-hydroxy-5-[3-(4-methylpiperazino)-propyl]-dibenzo[a,e]cyclohepta[1,5]diene is dissolved in 68 ml. of absolute alcohol, mixed with 30 ml. of 30% (w./v.) ethanolic hydrogen chloride solution and refluxed for two hours. After distillation of the alcohol under diminished pressure, the residue is recrystallized from methanol/ether. The product obtained, 5-[3-(4-methylpiperazino)-propylene] - dibenzo[a,e]cyclohepta[1,5]diene dihydrochloride, forms colorless water-soluble crystals of M.P. 250–252°.

*Example 8*

500 ml. of ammonia is charged to a flask provided with stirrer, dropping funnel and ammonia condenser, and sodium chips are introduced until the appearance of a permanent blue color. Then 4.5 g. of sodium is introduced while stirring continuously. After the sodium has gone into solution, 52.6 g. of 3-piperidino-1-propyne (prepared by dropping an ethereal solution of propargyl chloride to an ethereal solution of piperidine, in the molar proportion 1:2, warming on the water bath, and after separating the precipitated salt, isolating the product by fractional distillation: boiling point 61–62°/15 mm.) is added. As soon as the color disappears, to the ammoniacal suspension of 3-piperidino-1-propynyl-sodium is added, from the dropping funnel, a solution of 84.5 g. of dibenzo[a,e]cyclohepta[1,5]dien-5-one in 200 ml. of ether. The mixture is stirred for five hours, and then the ammonia is allowed to distill off overnight. On the following day, 500 ml. of ether is added and the reaction mixture is treated first with 56 g. of ammonium chloride, then with water. The ethereal layer is separated, dried and distilled. The residue is recrystallized from ethanol, yielding 5-hydroxy-5-(3-piperidino-1-propynyl)-dibenzo-[a,e]cyclohepta[1,5]diene of M.P. 158–160°.

6.4 g. of 5-hydroxy-5-(3-piperidino-1-propynyl)-dibenzo[a,e]cyclohepta[1,5]diene in 200 ml. of methanol is hydrogenated at 20° under normal pressure in the presence of Raney nickel. After uptake of the quantity of hydrogen theoretically required for conversion of the acetylenic linkage to an olefinic linkage, the catalyst is filtered off and methanol is distilled from the filtrate. Upon recrystallization of the residue, there is obtained 5 - hydroxy - 5-(3-piperidino-1-propenyl)-dibenzo[a,e]cyclohepta[1,5]diene of M.P. 188–189°.

10 g. of 5-hydroxy-5-(3-piperidino-1-propenyl)-dibenzo[a,e]cyclohepta[1,5]diene in 300 ml. of isopropanol is hydrogenated at 40° under a hydrogen pressure of 30 atmospheres gauge in the presence of 0.5 g. of platinum oxide and 5 g. of animal charcoal. After uptake of the quantity of hydrogen theoretically required for saturation of the propenyl radical, the hydrogenation is interrupted, the catalyst is filtered off, the filtrate is evaporated, and the residue is recrystallized from ethanol. The product, 5 - hydroxy - 5-(3-piperidinopropyl)-dibenzo[a,e]cyclohepta[1,5]diene, has M.P. 166–168°.

30 g. of 5-hydroxy-5-(3-piperidinopropyl)-dibenzo-

9

[a,e]cyclohepta[1,5]diene is dissolved in 300 ml. of absolute ethanol, mixed with 30 ml. of 30% (w./v.) ethanolic hydrogen chloride solution and refluxed for two hours. The alcohol is distilled off and the residue is recrystallized from ethanol/ether. The 5-(3-piperidinopropylidene)-dibenzo[a,e]cycloheptal[1,5]diene hydrochloride melts at 217–218°.

*Example 9*

500 ml. of ammonia is charged to a flask provided with stirrer, dropping funnel and ammonia condenser, and sodium chips are added until the appearance of a permanent blue color. Then 5.65 g. of sodium is added while stirring continuously. After the sodium has gone into solution, 42.3 g. of 3-(N-methyl-N-β-picolylamino)-1-propyne is added: the latter product is prepared by dropping an ethereal solution of propargyl chloride to an ethereal solution of methyl-(β-picolyl)-amine, in the molar ratio of 1:2, heating under reflux, separating the precipitated salt, and fractionating the remaining liquid: B.P. 129°/14 mm. To the colorless ammoniacal suspension of 3-(N-methyl-N-β-picolylamino)-1-propynyl-sodium is added dropwise a solution of 52.6 g. of dibenzo[a,e]cyclohepta[1,5]dien-5-one in 150 ml. of ether. The mixture is stirred for four hours, then 400 ml. of ether is added and the ammonia is allowed to evaporate overnight. On the following day, the reaction mixture is treated with 35 g. of ammonium chloride, then with water. The ether layer is separated, dried and evaporated. Upon recrystallization of the residue from ethyl acetate/petroleum ether, there is obtained 5-hydroxy-5-[3-(methyl-β-picolylamino)-1-propynyl]-dibenzo[a,e]cycloheptal[1,5]-diene, M.P. 159–160°.

12.3 g. of 5-hydroxy-5-[3-(methyl-β-picolylamino)-1-propynyl]-dibenzo[a,e,]cyclohepta[1,5]diene in 380 ml. of isopropanol is hydrogenated in the presence of platinum oxide. After uptake of the theoretical quantity of hydrogen, the hydrogenation ceases. The catalyst is filtered off, the filtrate is concentrated and the residue is recrystallized from petreleum ether (boiling range 80–105°), yielding 5-hydroxy-5-[3-(methyl-β-picolylamino)-propyl]-dibenzo[a,e]cycloheptal[1,5]diene, M.P. 85–86°.

*Example 10*

500 ml. of ammonia is charged to a flask provided with a stirrer, dropping funnel and ammonia condenser, and sodium chips are added until the appearance of a permanent blue color. Then 9.1 g. of sodium is added, while stirring continuously. After the sodium has gone into solution, 53.5 g. of 3-morpholino-1-propyne is added: the latter is prepared by dropping an ethereal solution of propargyl chloride into an ethereal solution of morpholine, in the molar ratio 1:2, refluxing on the steam bath, separating the precipitated salt, and fractionating the remaining liquid; B.P. 68–69°/12 mm. As soon as color disappears from the ammoniacal suspension of 3-morpholino-1-propynyl-sodium, a solution of 84.5 g. of dibenzo[a,e]cycloheptal[1,5]dien-5-one in 300 ml. of ether is added dropwise, the mixture is stirred for four hours, then 500 ml. of ether is added and the ammonia is allowed to evaporate overnight. On the following day, the reaction mixture is treated with 56 g. of ammonium chloride and then with water. The ether layer is separated, dried and evaporated. Recrystallization of the residue from ethyl acetate/petroleum ether yields 5-hydroxy-5-(3 - morpholino - 1 - propynyl) - dibenzo[a,e]cyclohepta-[1,5]diene of M.P. 137–138°.

6.66 g. of 5-hydroxy-5-(3-morpholino-1-propynl)-dibenzo[a,e]-cyclohepta[1,5]-diene in 200 ml. of methanol is hydrogenated at normal pressure and room temperature in the presence of Raney nickey. After uptake of the quantity of hydrogen theoretically required for conversion of the acetylenic bond to an olefinic bond, the hydrogenation is interrupted, the catalyst is filtered off and methanol is distilled from the filtrate. Recrystallization of the residue from ethyl acetate yields 5-hydroxy-5-(3-morpholino-1-propenyl)1-dibenzo[a,e]cycloheptal [1,5]-diene of M.P. 179–180°.

16.75 g. of 5-hydroxy-5-(3-morpholino-1-propenyl)-dibenzo[a,e]cyclohepta[1,5]diene in 500 ml. of isopropanol is hydrogenated at 35–40° under a hydrogen pressure of 30 atmospheres gauge in the presence of platinum oxide. After uptake of the theoretical quantity of hydrogen, the hydrogenation is interrupted, the catalyst is filtered off, the filtrate is evaporated, and the residue is recrystallized from ethyl acetate, yielding 5-hydroxy-5-(3-morpholinopropyl)-dibenzo[a,e]cycloheptal[1,5]diene of M.P. 150–151°.

4.6 g. of 5-hydroxy-5-(3-morpholinopropyl)-dibenzo-[a,e]cycloheptal[1,5]diene is refluxed for three hours with 70 ml. of 9% (w./v.) methanolic hydrogen chloride solution. The methanol is then distilled off under diminished pressure and the residue is recrystallized from ethanol/ether. The product, 5-(3-morpholinopropylidene)-dibenzo[a,e]cyclohepta[1,5]diene hydrochloride, is obtained as colorless water-soluble crystals of M.P. 226–227°.

*Example 11*

In a flask fitted with a stirrer, dropping funnel and ammonia condenser is placed 500 ml. of liquid ammonia, and sodium chips are added until the appearance of a permanent blue color. Then 9.1 g. of sodium is introduced in small portions and stirring is continued for 15 minutes. To the blue solution obtained is added dropwise 47.5 g. of 3-diethylamino-1-propyne (prepared by dropping an ethereal solution of propargyl chloride into an ethereal solution of diethylamine, in the molar ratio 1:2, heating on the water bath, separating the salt which precipitates, and fractionally distilling the resulting liquid: B.P. 120°/755 mm.). The reaction mixture is stirred for two hours, whereupon the blue color disappears. Then a solution of 84.5 g. of dibenzo[a,e]cyclohepta-[1,5]dien-5-one in 100 ml. of ether is added dropwise and the mixture is stirred for five hours. At the end of this time, 56 g. of ammonium chloride is added in portions, the reaction mixture is diluted with 500 ml. of ether and the ammonia is allowed to distill off overnight. On the following day the mixture is treated with water, the resulting solid is filtered off, and the ethereal layer is dried and distilled. The distillation residue is combined with the solid which has been filtered off, and the whole is recrystallized from ethanol. The resulting 5-hydroxy-5 - (3-diethylamino-1-propynyl)-dibenzo[a,e]cyclohepta-[1,5]diene melts at 146–148°.

6.4 g. of 5-hydroxy-5-(3-diethylamino-1-propynyl)-dibenzo-[a,e]cyclohepta[1,5]diene in 200 ml. of methanol is hydrogenated under normal pressure and room temperature in the presence of Raney nickel. After uptake of the quantity of hydrogen required for conversion of the triple bond to a double bond, the catalyst is filtered off, and methanol is distilled from the filtrate. The residue is recrystallized from absolute ethanol, yielding 5-hydroxy-5-(3-diethylamino - 1 - propenyl)-dibenzo[a,e]-cyclohepta[1,5]diene of M.P. 124–125°.

16 g. of 5-hydroxy-5-(3-diethylamino-1-propenyl)-dibenzo[a,e]cyclohepta[1,5]diene in 500 ml. of isopropanol is hydrogenated at 35–40° and under a hydrogen pressure of 30 atmospheres in the presence of platinum oxide. After uptake of the theoretical quantity of hydrogen, the hydrogenation is interrupted, the catalyst is filtered off, the filtrate is evaporated and the residue is recrystallized from petroleum ether (boiling range 30–45°), whereupon 5-hydroxy-5-(3-diethylaminopropyl)-dibenzo[a,e,]-cyclohepta[1,5]diene of M.P. 91–92° is obtained.

5.8 g. of 5-hydroxy-5-(3-diethylaminopropyl)-dibenzo-[a,e]cyclohepta[1,5]diene is dissolved in 60 ml. of absolute alcohol, mixed with 20 ml. of 30% (w./v.) ethanolic hydrogen chloride solution and refluxed for three hours. The alcohol is distilled off under diminished pressure and the residue is recrystallized from ethanol/ether. The product, 5 - (3 - diethylaminopropylidene)-dibenzo-[a,e]cyclohepta[1,5]diene hydrochloride, forms colorless water-soluble crystals of M.P. 168–169°.

*Example 12*

200 ml. of ammonia is charged to a flask provided with stirrer, dropping funnel and ammonia condenser, and sodium chips are added until a permanent blue color appears. Then a total of 2.9 g. of sodium is introduced while stirring continuously, and after about 15–20 minutes the sodium goes into solution. Then 12.6 g. of 3-dimethylamino-1-propyne is added and stirring is continued for one to two hours, until the blue color disappears. To the thus obtained colorless suspension of 3-dimethylamino-1-propynyl-sodium is added portionwise 30.6 g. of 3 - chloro - dibenzo[a,e,]cyclohepta[1,5]diene-5-one. The mixture is stirred for a further period of four hours, then 200 ml. of ether is added and the ammonia is allowed to distill off overnight. On the following day the mixture is treated with 17.8 g. of amomnium chloride, then with water, and the ether layer is separated, dried and evaporated. The residue is recrystallized from ethyl acetate, yielding 3 - chloro-5-hydroxy-5-(3-dimethylamino-1-propynyl)-dibenzo[a,e,]cyclohepta[1,5]diene as colorless crystals of M.P. 182–184°.

6.5 g. of 3-chloro - 5 - hydroxy-5-(3-dimethylamino-1-propynyl)-dibenzo[a,e]cyclohepta[1,5]diene in 200 ml. of methanol is hydrogenated at room temperature and under normal pressure in the presence of Raney nickel. After uptake of the quantity of hydrogen required for conversion of the triple bond to a double bond, the catalyst is filtered off, and methanol is distilled from the filtrate. By recrystallizing the residue from petroleum ether (boiling range 80–105°), there is obtained 3-chloro-5-hydroxy - 5 - (3 - dimethylamino-1-propenyl)-dibenzo[a,e]-cyclohepta[1,5]diene of M.P. 136–137°.

10 g. of 3-chloro - 5 - hydroxy-5-(3-dimethylamino-1-propenyl)-dibenzo[a,e]cyclohepta[1,5]diene in 500 ml. of isopropanol is hydrogenated at 30–40° under a hydrogen pressure of 30 atmospheres gauge in the presence of platinum oxide. After uptake of the theoretical quantity of hydrogen, the hydrogenation is interrupted, the catalyst is filtered off, the solvent is evaporated under diminished pressure, and the residue is recrystallized from petroleum ether (boiling range 80–105°). There is thus obtained 3-chloro-5-hydroxy-5-(3-dimethylaminopropyl)-dibenzo[a,e]cyclohepta[1,5]diene of M.P. 127–128°.

3 g. of 3-chloro-5-hydroxy-5-(3-dimethylaminopropyl)-dibenzo[a,e]cyclohepta[1,5]diene in 30 ml. of absolute alcohol is refluxed for two hours with 20 ml. of 30% (w./v.) ethanolic hydrogen chloride solution. Then the alcohol is evaporated under diminished pressure and the residue is recrystallized from alcohol/ether, yielding 3-chloro-5 - (3 - dimethylaminopropylidene)-dibenzo[a,e]-cyclohepta[1,5]diene hydrochloride as colorless water-soluble crystals of M.P. 210–212°.

We claim:
1. A compound represented by the formula

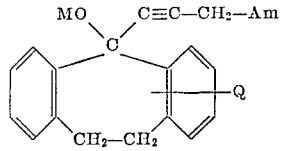

wherein M represents an alkali metal; Q represents a member selected from the group consisting of hydrogen, chlorine, bromine, lower alkyl, and lower alkoxy; and Am represents a tertiary amino radical selected from the group consisting of di-lower alkylamino, piperidino, morpholino, piperazino, N-methylpiperazino, and pyrrolidyl.

2. A process which comprises hydrolyzing a compound according to claim 1, thereby producing a compound represented by the formula

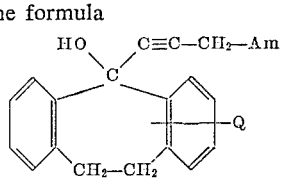

wherein Q and Am have the same significance as in claim 1.

3. A compound represented by the formula

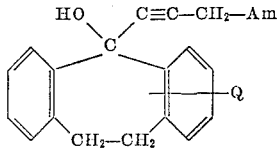

wherein Q represents a member selected from the group consisting of hydrogen, chlorine, bromine, lower alkyl, and lower alkoxy; and Am represents a tertiary amino radical selected from the group consisting of di-lower alkylamino, piperidino, morpholino, piperazino, N-methylpiperazino, and pyrrolidyl.

4. 5 - hydroxy-5-[3-di(lower alkyl)amino-1-propynyl]-dibenzo[a,e]cyclohepta[1,5]diene.

5. 5 - hydroxy-5 - (3 - dimethylamino-1-propynyl)-dibenzo[a,e]cyclohepta[1,5]diene.

References Cited in the file of this patent
FOREIGN PATENTS
858,186     Great Britain _____ Jan. 11, 1961

OTHER REFERENCES
Hoffman-La Roche—Derwent Belgian Patents Report, vol. 68 B, page C-20,

UNITED STATES PATENT OFFICE
CERTIFICATE OF CORRECTION

Patent No. 3,126,411                                      March 24, 1964

Gérald Rey-Bellet et al.

It is hereby certified that error appears in the above numbered patent requiring correction and that the said Letters Patent should read as corrected below.

Column 1, line 44, for "its" read -- is --; column 3, line 13, formula (VII), for that portion of the formula reading "N-C≡C-" read -- M-C≡C- --; column 5, line 17, for "propyenyl" read -- propenyl --; line 33, for "inttroduced" read -- introduced --; column 9, lines 6, 32, 42, 58, and column 10, lines 2, 12, and 15, for "cycloheptal", each occurrence, read -- cyclohepta --; column 9, line 40, for "petreleum" read -- petroleum --.

Signed and sealed this 10th day of November 1964.

(SEAL)
Attest:

ERNEST W. SWIDER                                      EDWARD J. BRENNER
Attesting Officer                                             Commissioner of Patents